April 23, 1935.     L. H. HUMPHREY     1,998,543
EGG PRESERVING
Filed July 16, 1932     2 Sheets-Sheet 1

Inventor
Leo H. Humphrey
by David Rives
Attorney

April 23, 1935.   L. H. HUMPHREY   1,998,543
EGG PRESERVING
Filed July 16, 1932   2 Sheets-Sheet 2

Inventor
Leo H. Humphrey
by David Lewis
Attorney

Patented Apr. 23, 1935

1,998,543

UNITED STATES PATENT OFFICE 1,998,543

EGG PRESERVING

Leo Harris Humphrey, Medford, Mass., assignor of one-third to Anthony Ciamci and one-third to Augustus Loschi, both of East Boston, Mass.

Application July 16, 1932, Serial No. 622,883

3 Claims. (Cl. 99—8)

The present invention relates to the art of preserving foods, such as eggs, against deterioration and decay.

As the shells are porous, eggs have a tendency to absorb odors from the atmosphere in which they are contained; and, for the same reason, the moisture within the eggs has a tendency to evaporate through the shells. Both these tendencies cause the eggs to deteriorate.

A chief object of the invention is to provide a new and improved container that shall shield the eggs against both the absorption of outside odors and evaporation of moisture from within.

A further object is to provide a new and improved food container that shall be inexpensive.

Other and further objects will be explained hereinafter and will be particularly pointed out in the appended claims.

Figure 1:
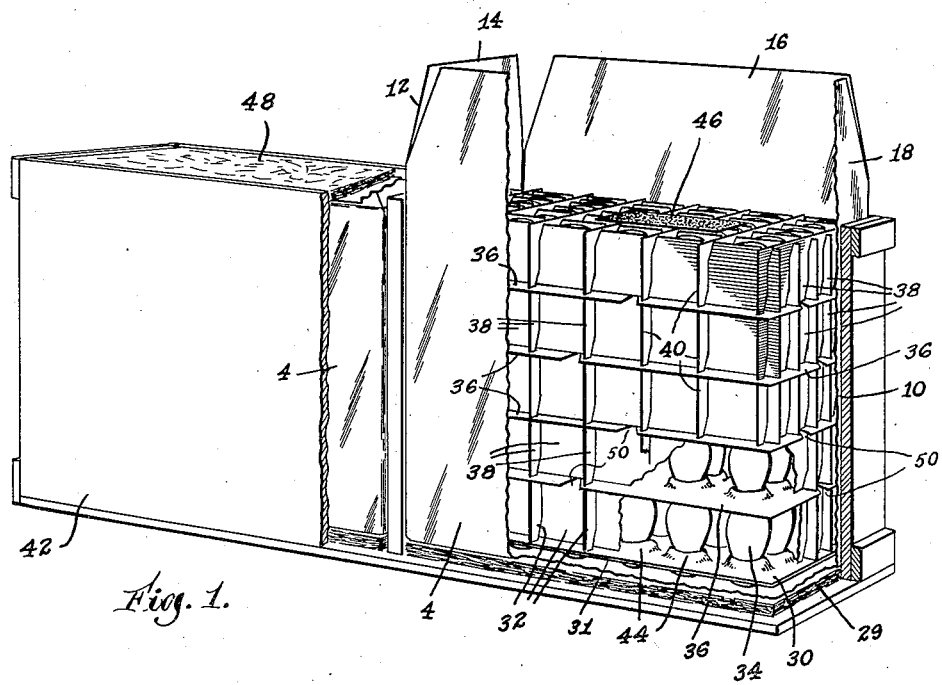
Figure 2:
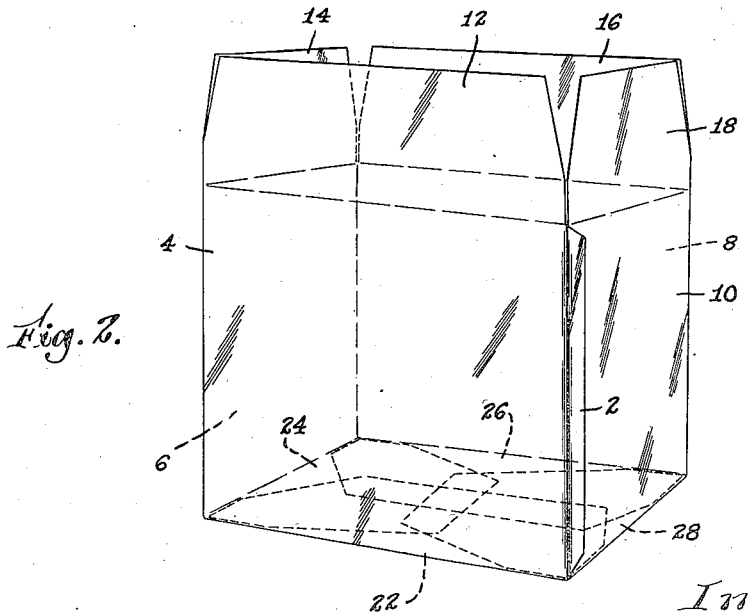
Figure 3:
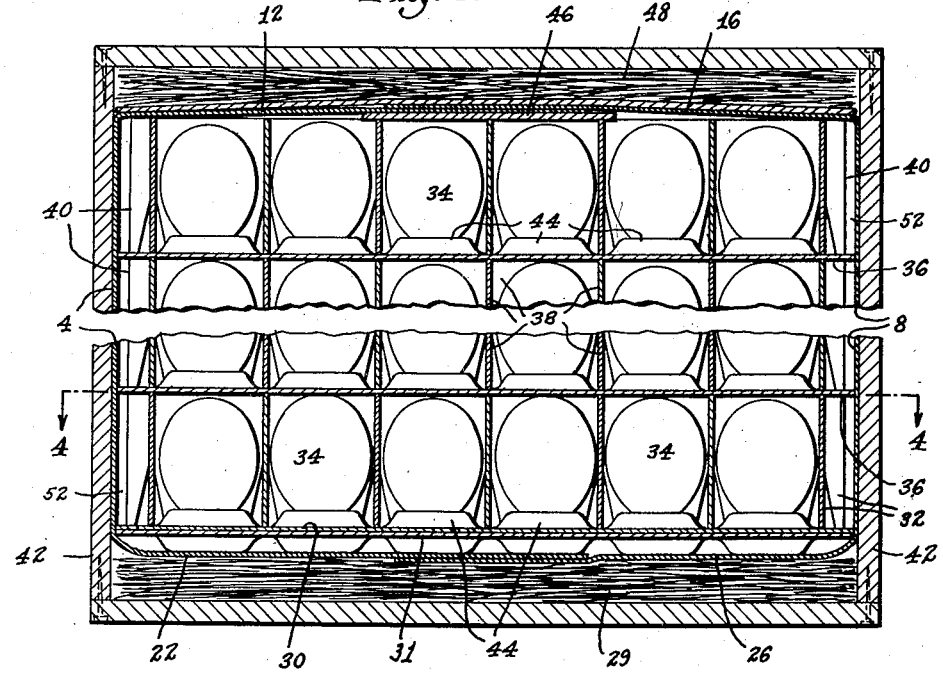
Figure 4:
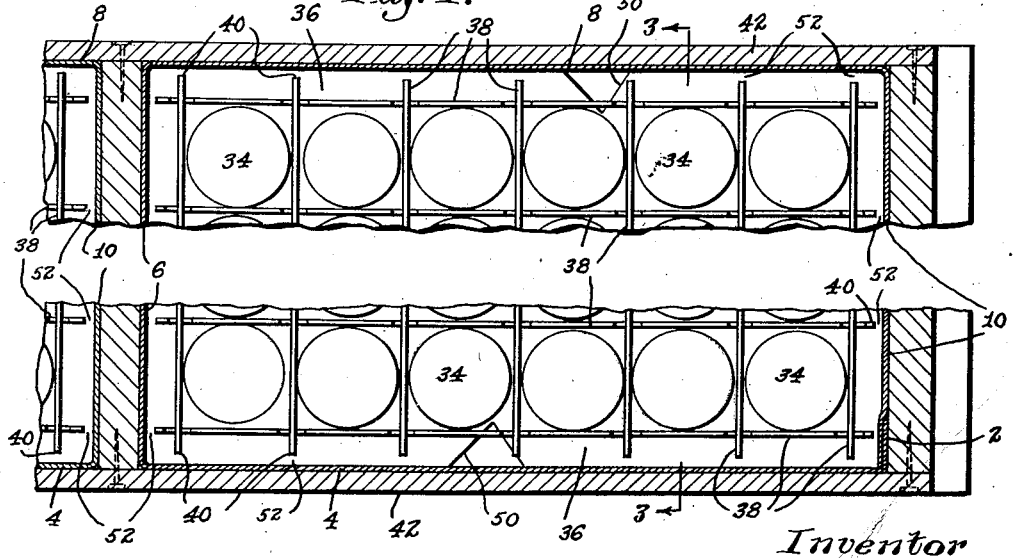

The invention will now be explained in connection with the accompanying drawings, in which Fig. 1 is a perspective, with parts broken away and in section, of an egg case embodying the present invention; Fig. 2 is a perspective of a preferred egg container, before loading with eggs and sealing; and Figs. 3 and 4 are sections taken respectively upon the line 3—3 of Fig. 4 and 4—4 of Fig. 3, looking in the directions of the arrows.

In Fig. 2, there is disclosed a container made of any suitable material, such as Cellophane, No. 300, moisture-and-odor proof, or treated as hereinafter described in connection with the flats and fillers, so that its walls shall be non-odor-emitting and non-moisture-absorbing. Cellophane is preferred, because it is strong, odorless and tasteless, and permits visual, sample inspection of the eggs in the sealed container, but it may be made of any other suitable material, including water-proof kraft paper, which has the same qualities, though kraft paper is much heavier, though also strong. The container envelope may be made of a single sheet of material, comprising a side glued flap 2, four equal side walls 4, 6, 8 and 10, top glued flaps 12, 14, 16 and 18, and corresponding bottom glued flaps 22, 24, 26 and 28, which are shown folded and glued together to form a bottom for the container. The flap 2 is glued to the wall 10. The upper flaps 12, 14, 16 and 18 will similarly be folded and then readily glued together to seal the container after filling with eggs. The side walls may be 12 inches high and 11¼ inches wide and broad, so that the container may fit in one end or compartment of a standard, wood, egg case, as shown in Fig. 1. The container, as shown in Fig. 2, is first disposed in the egg case on a padding 29, with the top flaps 12, 14, 16 and 18 opened back for convenience in packing. A flat 30 is then laid on the bottom wall of the container, superposed, if desired, over another flat 31, or the flat 31 may rest outside the container on the padding 29. Interlocked fillers 32 are laid on the flat 30, after which eggs 34 are placed in the egg-containing spaces thus formed between the flat 30, the fillers 32 and another flat 36 laid thereover. Further interlocked fillers 38 are then laid over the flat 36, the process being repeated until the container becomes completely packed with eggs in the customary manner, usually fifteen dozen eggs for one half of a thirty-dozen, standard egg case. The sealed container envelope will prevent evaporation from within the container to the outside of the container and the flats and fillers are of such nature as to prevent evaporation of water and other gaseous or liquid constituents of the eggs from the individual eggs, as well as prevent contamination of the eggs from the outside and tend to maintain them at a uniform temperature.

To this end, the flats and fillers, before packing, if constituted of ordinary composition paper, calendered straw board, or other material widely used for this purpose, are sprayed, impregnated, diffused or otherwise treated with any desired substance to render them non-odor-emitting and non-moisture-absorbing, such as odorless wax, in liquid form. The wax may be No. 3, or best-grade paraffin, having a melting temperature of 135 degrees F. Other waxes, such as carnauba, may be used, either alone or in combination. Each egg becomes thus packed in a separate, egg-containing, cube-like space bounded by non-odor-emitting and non-moisture-absorbing walls formed by upper and lower flats 30 and 36 and the interlocked side fillers 32 between the flats.

Instead of a flat on the topmost layer of eggs, a blotting-paper or other pad 46, about seven inches long and four to seven inches wide, suitably saturated with a germicide, such as carbolic acid, to prevent bacterial action, is placed on the uppermost fillers. The pad may be previously treated and dried, and merely dipped in, or wet with, water before using. The flaps 12, 14, 16 and 18 are then folded and glued to seal the container and render it air-tight. A customary, anti-breakage packing 48 may be placed over the sealed container, and a cover is nailed over the egg case.

The flats 30 and 36 may be provided with cup-shaped depressions 44 for receiving the ends of the eggs, thereby providing a more completely enclosed egg-containing space, and thus enclosing each egg more effectively in its individual egg-containing space than would otherwise be the case.

Evaporation of moisture from the eggs, with resulting loss in weight and quality, oxidation of their vitamin A, and the formation of mould spots and mustiness are thus prevented, the eggs will be kept clean and at uniform temperature and impervious to outside odors, and their flavor will be preserved. Particularly are the eggs protected, by this processing of the flats and fillers, from absorbing the odors of the composition materials of which the flats and fillers are made.

Not only are the eggs thus preserved against deterioration, but they are prevented from breakage. During transportation, the egg cases are thrown back and forth, thus driving the extreme projecting ends 40 of the fillers 32 and 38 and the ends of the flats 30 and 36 against the side walls 42 of the egg case, and crushing them. After one or two such crushings, they become so weak that, at the next shaking to which the egg case may be subjected,—as by jolting the freight car in which they are carried, or by careless handling of an expressman,—the said projecting filler ends 40 and the corresponding flat ends will afford no protection to the eggs at all, but will permit the eggs to come into violent contact with the sides 42 of the wooden egg case, with resulting breakage. This is prevented by the present invention, because the wax or other substance with which the flats and fillers are treated stiffens them. Furthermore, even when some of the eggs do accidentally become broken, and their contents flow over on to the flats and the fillers, the latter will not become soaked and, therefore, weakened, thereby. The same strengthening effect is thus produced, with thin flats and fillers, that would otherwise be obtained with relatively very thick flats and fillers.

In accordance with the present invention, therefore, provision is for the first time made for properly preserving the eggs from the moment when laid until they reach the retail dealer, who breaks the sealed containers. The containers may, of course, be made of smaller size, so as to protect the eggs until they actually reach the ultimate consumer. All that is necessary is for the farmer to pack his eggs promptly, as laid. If, at any time, it is desired to test the eggs, as by candling, all that is necessary is to break the container and repack, as above described, in a new container.

As ordinarily manufactured, the flats are of dimensions such as to fit directly against the inside of the envelope or container, thereby having a tendency to seal the successive compartments between adjacent flats. This would, of course, tend to prevent the germicide-containing moisture from the pad 46 percolating throughout the container. To overcome this difficulty, the flats may be provided with interior openings or, if preferred, a plurality of side notches 50 may be cut along two or more sides of the flats. The fillers, on the other hand, are ordinarily of shorter dimension than the width and breadth of the envelope, so that a sufficient space is formed between their ends and the envelope, as illustrated at 52. Furthermore, at the points where the fillers are interlocked, there is ordinarily a certain degree of opening which further adds to the diffusion of the germicidal moisture.

Modifications will occur to persons skilled in the art, and all such are considered to fall within the spirit and scope of the invention, as defined in the appended claims.

What is claimed is:

1. An egg container having a plurality of composition flats and fillers in the container, the fillers being interlocked between the flats to provide egg-containing spaces, the composition material of the flats and the fillers being treated with a non-odor-emitting and a non-moisture-absorbing and stiffening substance to render them stiffer than the untreated composition, non-odor-emitting and also non-moisture-absorbing, whereby the said egg-containing spaces are bounded by non-odor-emitting and non-moisture-absorbing walls provided by the flats and the fillers, and whereby the stiffened walls have a tendency to protect the eggs in the egg-containing spaces against breakage.

2. An egg container having a plurality of composition flats and fillers in the container, the flats being provided with cup-shaped depressions and the fillers being interlocked between the flats to provide egg-containing spaces, with the ends of the eggs being received in the depressions, and the composition material of the flats and the fillers being treated with a non-odor-emitting and a non-moisture-absorbing stiffening substance to render them stiffer than the untreated composition and also non-odor-emitting and non-moisture-absorbing, whereby the said egg-containing spaces are bounded by non-odor-emitting and non-moisture-absorbing walls provided by the flats and the fillers, and whereby the stiffened walls have a tendency to protect the eggs in the egg-containing spaces against breakage.

3. An egg container having a plurality of composition flats and fillers in the container, the fillers being interlocked between the flats to provide egg-containing spaces, the composition material of the flats and the fillers being treated with a non-odor-emitting and a non-moisture-absorbing stiffening substance to render them stiffer than the untreated composition and also non-odor-emitting and non-moisture-absorbing, whereby the said egg-containing spaces are bounded by non-odor-emitting and non-moisture-absorbing walls provided by the flats and the fillers, and whereby the stiffened walls have a tendency to protect the eggs in the egg-containing spaces against breakage, and means for sealing the container.

LEO H. HUMPHREY.